(12) United States Patent
Hunt

(10) Patent No.: US 6,778,886 B2
(45) Date of Patent: Aug. 17, 2004

(54) SATELLITE LOCATION DETERMINATION SYSTEM

(75) Inventor: Jeffrey H. Hunt, Chatsworth, CA (US)

(73) Assignee: The Boeing Company, Chicago, IL (US)

( * ) Notice: Subject to any disclaimer, the term of this patent is extended or adjusted under 35 U.S.C. 154(b) by 108 days.

(21) Appl. No.: 10/273,500

(22) Filed: Oct. 18, 2002

(65) Prior Publication Data

US 2004/0075044 A1 Apr. 22, 2004

(51) Int. Cl.$^7$ .............................................. G06F 7/00
(52) U.S. Cl. ............................ 701/13; 701/4; 342/357; 342/361
(58) Field of Search ................................ 343/757, 765; 701/13, 4, 220, 226; 342/356, 357, 361, 363; 244/164, 158 R

(56) References Cited

U.S. PATENT DOCUMENTS

| | | | |
|---|---|---|---|
| 4,700,150 A | 10/1987 | Hall et al. | 332/751 |
| 5,079,444 A | 1/1992 | Kallenbach et al. | 359/328 |
| 5,810,297 A * | 9/1998 | Basuthakur et al. | 244/176 |
| 6,038,055 A | 3/2000 | Hansch et al. | 359/279 |
| 6,142,423 A | 11/2000 | Wehner | 244/164 |
| 6,195,044 B1 | 2/2001 | Fowell | 342/367 |
| 6,216,983 B1 | 4/2001 | Wehner et al. | 244/158 R |
| 6,281,853 B1 | 8/2001 | Caille et al. | 343/754 |
| 6,295,019 B1 | 9/2001 | Richards et al. | 342/125 |
| 6,430,416 B1 | 8/2002 | Loomis | 455/456 |
| 6,484,073 B1 * | 11/2002 | Fichter et al. | 701/13 |
| 6,535,801 B1 * | 3/2003 | Geier et al. | 701/13 |

OTHER PUBLICATIONS

*Absolute Optical Frequency Measurement of the Cesium $D_1$ Line with a Mode–Locked Laser*—Physical Review Letters, vol. 82, No. 18, May 3, 1999, pp. 3568–3571, Udem et al.
*Phase Coherent Vacuum–Ultraviolet to Radio Frequency Comparison with a Mode–Locked Laser*—Physical Review Letters, vol. 84, No. 15, Apr. 10, 2000, pp. 3232–3235, Reichert et al.
*Direct Link between Microwave and Optical Frequencies with a 300 THz Femtosecond Laser Comb*—Physical Review Letters, vol. 84, No. 22, May 29, 2000, pp. 5102–5105, Diddams et al.
*Controlling the Phase Evolution of Few–Cycle Light Pulses*—Physical Review Letters, vol. 85, No. 4, Jul. 24, 2000, pp. 740–743, Apolonski et al.
*Optical Frequency Synthesizer for Precision Spectroscopy*—Physical Review Letters, vol. 85, No. 11, Sep. 11, 2000, pp. 2264–2267, Holzwarth et al.

* cited by examiner

*Primary Examiner*—Hoang V. Nguyen
(74) *Attorney, Agent, or Firm*—Larry Ginsberg; William C. Anderson

(57) ABSTRACT

A satellite location determination system for a constellation of satellites includes a plurality of optical transceivers. Each optical transceiver is associated with a respective satellite and includes an optical synthesizer, transmission conditioning optics, a telescope assembly, reception conditioning optics, and an optical to electronic signal converter. The optical synthesizer produces phase-coherent optical laser pulses. The transmission conditioning optics appropriately conditions the characteristics of the phase-coherent optical laser pulses. The telescope assembly receives an output of the transmission conditioning optics and transmits an optical transceiver output into space for reception by an optical transceiver associated with another of the satellites. The telescope assembly also receives an optical transceiver output from another of the satellites. Reception conditioning optics appropriately conditions the characteristics of the optical transceiver output received from another of the satellites. An optical to electronic signal converter receives an output from the reception conditioning optics and provides an electronic signal output representing the location of other satellites in the constellation. Use of the optical synthesizer for producing the phase-coherent optical laser pulses provides enhanced satellite location information.

17 Claims, 2 Drawing Sheets

SATELLITE LOCATION DETERMINATION SYSTEM

BACKGROUND OF THE INVENTION

1. Field of the Invention

The present invention relates to satellite constellations and more particularly to providing high precision location information between satellites.

2. Description of the Related Art

Satellites are often flown in so-called constellations to assure that they can remain in constant communication with large areas of the earth's surface. When orbiting in this fashion, the satellites spend part of their time sensing each other's locations and attitudes. As a result, there is substantial background art associated with constellation positioning. However, this art relates to systems that use a relatively low degree of precision.

A much greater number of applications would exist for constellations if the satellites' positions could be ascertained to a finer level of precision than presently provided. For example, optical imaging satellites have largely reached their limits in their ability to spatially resolve features. Higher resolutions will only be possible by increasing the size of their optical apertures. Systems are sufficiently large that improvements of only a factor of 2–3 are realistically possible over present architectures.

Using a coherent array of detectors can solve this dilemma. An analogous system is used in the microwave or radiowave regime. The ability to resolve small distant objects had reached its limit because increasing the size of the dishes had become impractical. By using large arrays of radio telescopes, for the example, the very large array or VLA, a large synthetic aperture can be generated having a resolving power that is equivalent to the diameter of the array. The VLA dishes extend across 36 kilometers. Even though the individual dishes are only 25 meters in diameter, they operate coherently. Consequently, they are able to produce a resolving power that is the equivalent of a single dish with a 36 kilometer aperture, without the commensurate construction difficulties.

In order to allow the dishes to work as a unit, the signals that they receive must be analyzed in a coherent fashion. Calibrations that are performed can take advantage of the fact that, to a high degree of precision, the receivers do not move since they are firmly rooted on the earth's surface. This advantage is not present for orbiting satellites.

What is required for the satellites' free movement is a device that can provide a high precision distance reference so that all the satellites in a space borne array know exactly where they, and all the other satellites, are located. Optical wavelengths are on the order of $10^{-6}$ meters, while satellite separations may be $10^5$ meters. The implication is that a reference standard would need to be accurate to 1 part in $10^{12}$, at a minimum.

In U.S. Pat. No. 4,700,150, J. L. Hall et. al. discuss a means to stabilize a laser frequency. The '150 system incorporates an acousto-optic frequency shifter and a fast electro-optic phase modulator. The system operates on a single laser frequency that is stabilized by referencing its frequency to an external stabilized source. It does not involve the production of multiple frequencies. Therefore, accuracy is limited.

In U.S. Pat. No. 6,142,423, J. W. Wehner discusses ephemeris and attitude determination by using the optical payload installed on a satellite for pointing information. Many satellites use optical payloads for pointing and tracking. Consequently, these systems can, in some limited way, also provide information regarding satellite ephemeris. However, since the systems are not specifically designed for this, their accuracy is limited and is based upon repeated, that is, averaged measurements. Therefore, accuracy is limited. Furthermore, this system does not involve the use of laser pulses that are phase-coherent.

In U.S. Pat. No. 6,195,044 B1, R. A. Fowell also discusses the use of laser payloads, installed for optical crosslinks, for attitude determination. The '044 architecture does not have a dedicated position sensor. Furthermore, the optical pulses are produced by a source that is not capable of producing phase-coherent pulses.

In U.S. Pat. No. 6,281,853 B1, G. Caille et. al. discuss an antenna for receiving and transmitting signals used to control the location of satellites within a constellation. However, the device exclusively uses radio wave signals. The relatively low frequencies associated with radio wave signals places a fundamental limitation on the accuracy of the position information they can provide. There is no discussion of the use of optical wavelength devices for control of the satellites.

In U.S. Pat. No. 6,295,019 B1, J. L Richards et. al. disclose another radio wave device for position sensing. The device performs its distance determination by measuring the round trip time for a signal to propagate from one source to another and back again. Consequently, the measurement is actually a two step process that measures round trip time. There is no discussion of the use of optical frequencies in this patent.

In U.S. Pat. No. 6,430,416 B1, P. V. W. Loomis discusses a satellite location system which combines GPS signals with local radio wave information. Again, there is no discussion of the use of optical wavelength radiation for controls.

Recently, optical synthesizer technology has progressed to the point where pulse timing standards routinely have accuracy of $10^{-14}$ and better. This is accomplished with the use of a large number of optical frequencies that are generated in the synthesizer.

As will be disclosed below in detail, the present invention uses the high precision timing afforded by pulses from an optical synthesizer to provide equivalent positioning information of sufficient resolution that it is possible to stabilize an array of spaceborne assets. Specifically, it addresses the use of an optical synthesizer to generate an extremely precise time reference that translates into an extremely precise distance reference.

In order to translate a time standard to a distance standard, maintaining the accuracy of the time standard, a velocity needs to be associated with the time, having a precision that must also be very high. Fortunately, the speed of light in a vacuum represents just such a velocity standard. It can be used to transfer the time standard's high precision to a distance standard's high precision.

The present invention involves the incorporation of optical synthesizers into spaceborne assets that need to be operated as an array, as a means to provide the high degree of distance precision necessary for the assets to work in a coherent fashion.

In Physical Review Letters 82 p.3568–3571, "Absolute Optical Frequency Measurement of the Cesium $D_1$ Line with a Mode-Locked Laser," Th. Udem et. al. demonstrate how the constriction of mode-locked laser pulses to operate in a phase-coherent fashion can create a means to perform high-precision spectroscopy. The optical system disclosed may be considered to be technically close to an optical synthesizer. There is no discussion of the use of these pulses for satellite constellation positioning information.

In Physical Review Letters 84, p 3232–3235, "Phase Coherent Vacuum-Ultraviolet to Radio Frequency Comparison with a Mode-Locked Laser." J. Reichert et. al. discuss the operation of an optical synthesizer for producing phase-coherent optical pulses that extend in frequency from radio frequencies to the ultra-violet. The resulting system provides a frequency measurement that is accurate to one part in $10^{13}$. However, there is no discussion of the equivalence of this frequency measurement to making accurate distance measurements. There is no discussion of satellite positioning applications.

In Physical Review Letters 84, p. 5102–5105, "Direct Link between Microwave and Optical Frequencies with a 300 THz Femtosecond Laser Comb," S. A. Diddams et. al. discuss the performance enhancement of an optical synthesizer which includes a microstructure optical fiber.

In Physical Review Letters 85, p. 740–743, "Controlling the Phase Evolution of Few-Cycle Light Pulses," A. Apolonski et. al. discuss a means to add precision to the optical synthesizer described by J. Reichert. There is no discussion of applications.

In Physical Review Letters 85, p. 2264–2267, "Optical Frequency Synthesizer for Precision Spectroscopy," R. Holzwarth et. al. discuss the highest precision optical frequency synthesizer to date. That system demonstrates precision to a few parts in $10^{15}$. The optical synthesizer generates $10^6$ phase-coherent optical frequencies. The application mentioned in this paper relates to optical clocks. There is no discussion of the satellite constellation control.

In U.S. Pat. No. 5,079,444, R. Kallenbach et. al. discuss a nonlinear optical means to couple the interaction of an optical beam and a microwave beam. Although this patent discloses elements of an optical synthesizer, it is not related to potential satellite constellation applications.

In U.S. Pat. No. 6,038,055, T. Hansch et. al. disclose a means for producing phase-coherent pulses. The system provides amplification of phase-coherent pulses produced in a separate medium. The reference does not discuss the oscillator necessary to produce the phase-coherent pulses in the first place. Furthermore, there is no mention of the use of the pulses as a means to monitor or potentially control the position of a satellite within a constellation.

SUMMARY

The present invention is a satellite location determination system for a constellation of satellites. The satellite location determination system includes a plurality of optical transceivers. Each optical transceiver is associated with a respective satellite. Each optical transceiver includes an optical synthesizer, transmission conditioning optics, a telescope assembly, reception conditioning optics, and an optical to electronic signal converter. The optical synthesizer produces phase-coherent optical laser pulses. The transmission conditioning optics appropriately conditions the characteristics of the phase-coherent optical laser pulses. The telescope assembly receives an output of the transmission conditioning optics and transmits an optical transceiver output into space for reception by an optical transceiver associated with another of the satellites. The telescope assembly also receives an optical transceiver output from another of the satellites. Reception conditioning optics appropriately conditions the characteristics of the optical transceiver output received from another of the satellites. An optical to electronic signal converter receives an output from the reception conditioning optics and provides an electronic signal output representing the location of other satellites in the constellation. Use of the optical synthesizer for producing the phase-coherent optical laser pulses provides enhanced satellite location information.

Use of the high precision timing afforded by the pulses from the optical synthesizer provide equivalent positioning information of sufficient resolution that it is possible to stabilize this array of satellites. It generates an extremely precise time reference that translates into an extremely precise distance reference. The optical synthesizer is capable of generating a large number ($10^6$) of optical frequencies.

Other objects, advantages, and novel features will become apparent from the following detailed description of the invention when considered in conjunction with the accompanying drawings.

DETAILED DESCRIPTION OF THE INVENTION

Figure 1:
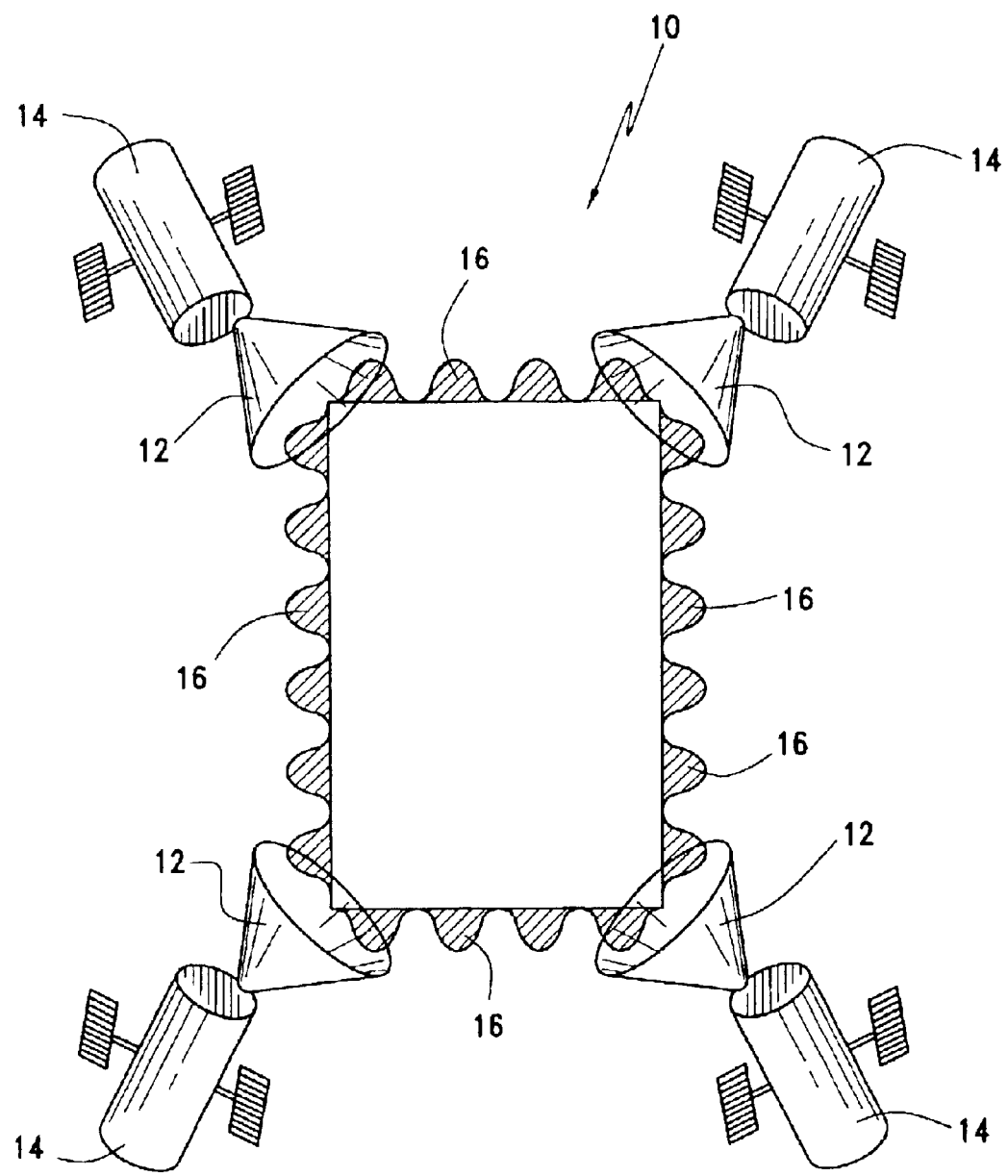
FIG. 1 is a schematic illustration of a satellite constellation implementing the satellite location determination system of the present invention.

Referring now to the drawings and the characters of reference marked thereon, FIG. 1 illustrates a preferred embodiment of the satellite location determination system of the present invention, designated generally as 10. The satellite location determination system 10 includes a plurality of optical transceivers 12, each associated with a respective satellite 14 of a constellation of satellites. Phase-coherent optical laser pulses 16 produced by the optical transceivers 12 provide enhanced satellite location information.

Figure 2:
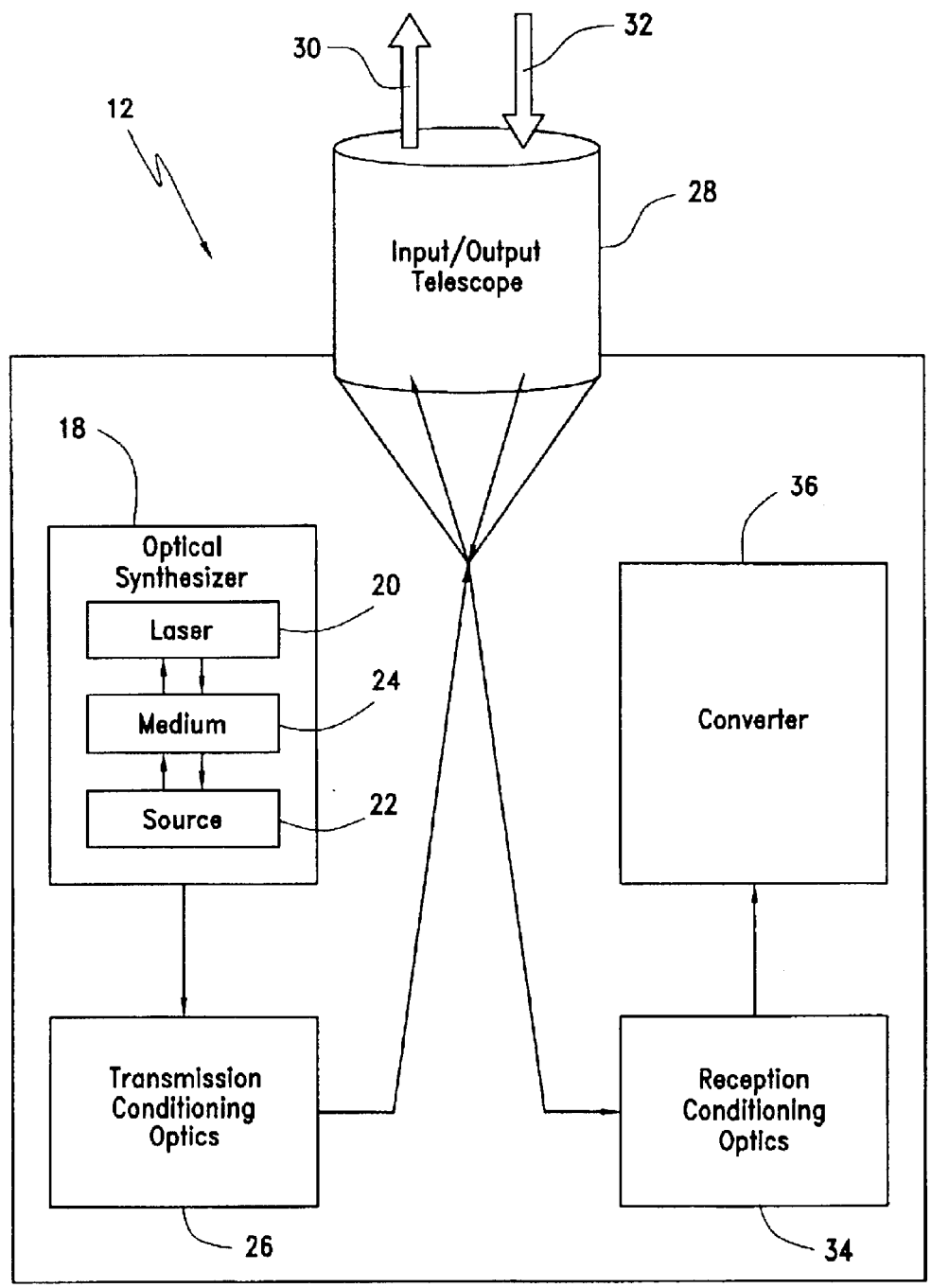
FIG. 2 is a schematic illustration of an optical transceiver of the satellite location determination system of the present invention.

Referring now to FIG. 2, it can be seen that each optical transceiver 12 includes an optical synthesizer 18 for producing phase-coherent optical laser pulses. The optical synthesizer is preferably of a type that includes a femtosecond mode-locked laser 20; a radio frequency source 22; and, a non-linear optical medium 24 for coupling the femtosecond mode-locked laser 20 to the radio frequency source 22 via a nonlinear optical interaction. The phase-coherent optical laser pulses contain frequency components ranging from a fundamental frequency of the mode-locked laser 20 to a second harmonic frequency of the mode-locked laser 20 in frequency steps that correspond to the frequency of the radio frequency source. This type of optical synthesizer is disclosed in Optical Frequency Synthesizer for Precision Spectroscopy, Physical Review Letters, Vol. 85, No 11, Sept. 11, 2000.

The non-linear optical medium is preferably a photonic crystal optical fiber. Alternatively, it may be, for example, a nonlinear optical fiber, a nonlinear optical bulk crystal or nonlinear optical film. In general, any medium that exhibits a finite nonlinear optical response over a certain range of optical frequencies can be employed to some level of fidelity. The photonic crystal optical fiber is preferably chosen because it combines a good nonlinear response, with a long interaction length and can maintain these characteristics over a broad range of optical wavelengths. The femtosecond laser may be based on one of several lasing species. Typically, the lasing medium will be a solid-state device capable of being operated in a mode-locked fashion. This may include such lasers as Nd:YAG or Ti:Sapphire.

Transmission conditioning optics 26 is used for appropriately conditioning the characteristics of the phase-coherent optical laser pulses. The transmission conditioning optics 26 preferably includes optical attenuation filters, color filters, narrow frequency notch filters, diffraction gratings, thin film coated optics, Brewster angle optics, polarization sensitive prisms, etc., which provide a means for providing intensity control, frequency control and polarization control.

A telescope assembly 28 receives an output of the transmission conditioning optics 26 and transmits an optical transceiver output 30 into space for reception by an optical transceiver associated with another of the satellites 14. The telescope assembly 28 also receives an optical transceiver output 32 from another satellite 14. The telescope assembly 28 includes a series of refractive and/or reflective optics such that the laser pulse spot size and propagation direction are conditioned to allow the pulses to both propagate into space to another satellite or to receive pulses from another satellite. The telescope will contain one or more optical elements whose design will change the light propagation parameters inside the satellite into propagation parameters appropriate for transmission to another satellite. The optical elements may be either refractive (lenses) or reflective (mirrors), or may be a combination of the two.

Reception conditioning optics 34 appropriately conditions the characteristics of the optical transceiver output 32 received from another satellite 14. The reception conditioning optics 34 preferably provides intensity, frequency and polarization control. The optics 34, may be, for example, suitable optical attenuation filters, color filters, narrow frequency notch filters, diffraction gratings, thin film coated optics, Brewster angle optics, polarization sensitive prisms, etc.

An optical to electronic signal converter 36 receives an output from the reception conditioning optics 34 and provides an electronic signal output representing the location of other satellites in the constellation. The optical to electronic signal converter 36 may be, for example, a semiconductor photodiode, a semiconductor avalanche photodiode or a photomultiplier. Whatever converter is used, it must have sufficient sensitivity to detect the signal and must have a wavelength bandwidth broad enough to detect the broad spectrum of light associated with optically synthesized pulses.

Use of the optical synthesizer 18 for producing the phase-coherent optical laser pulses 16 provides enhanced satellite location information.

The incorporation of optical synthesizer into the satellites comprising the constellation allows the satellites to determine their relative positions to very high accuracy. Satellite location precisions on the order of a few parts in $10^{15}$ become possible with this technology. With this higher location precision, coherent optical detection between satellites, so-called synthetic aperture detection, becomes possible.

Obviously, many modifications and variations of the present invention are possible in light of the above teachings. It is, therefore, to be understood that within the scope of the appended claims, the invention may be practiced otherwise than as specifically described.

What is claimed and desired to be secured by Letters Patent of the United States is:

1. A satellite location determination system for a constellation of satellites, comprising:
   a plurality of optical transceivers, each associated with a respective satellite, each optical transceiver, comprising:
   a) an optical synthesizer for producing phase-coherent optical laser pulses;
   b) transmission conditioning optics for appropriately conditioning the characteristics of said phase-coherent optical laser pulses;
   c) a telescope assembly for receiving an output of said transmission conditioning optics and for transmitting an optical transceiver output into space for reception by an optical transceiver associated with another of said satellites, said telescope assembly also for receiving an optical transceiver output from another of said satellites;
   d) reception conditioning optics for appropriately conditioning the characteristics of the optical transceiver output received from said another of said satellites; and,
   e) an optical to electronic signal converter for receiving an output from said reception conditioning optics and providing an electronic signal output representing the location of other satellites in the constellation, wherein
      use of the optical synthesizer for producing the phase-coherent optical laser pulses provides enhanced satellite location information.

2. The satellite location determination system of claim 1, wherein said optical synthesizer, comprises:
   a) a femtosecond mode-locked laser;
   b) a radio frequency source; and,
   c) a non-linear optical medium for coupling said femtosecond mode-locked laser to said radio frequency source via a nonlinear optical interaction, wherein
      said phase-coherent optical laser pulses contain frequency components ranging from a fundamental frequency of said mode-locked laser to a second harmonic frequency of the mode-locked laser in frequency steps that correspond to the frequency of the radio frequency source.

3. The satellite location determination system of claim 1, wherein said non-linear optical medium comprises a photonic crystal optical fiber.

4. The satellite location determination system of claim 1, wherein said transmission conditioning optics comprises means for providing intensity control.

5. The satellite location determination system of claim 1, wherein said transmission conditioning optics comprises means for providing frequency control.

6. The satellite location determination system of claim 1, wherein said transmission conditioning optics comprises means for providing polarization control.

7. The satellite location determination system of claim 1, wherein said telescope assembly comprises a series of refractive and/or reflective optics such that the laser pulse spot size and propagation direction are conditioned to allow the pulses to both propagate into space to another satellite or to receive pulses from another satellite.

8. The satellite location determination system of claim 1, wherein said reception conditioning optics comprises means for providing intensity control.

9. The satellite location determination system of claim 1, wherein said reception conditioning optics comprises means for providing frequency control.

10. The satellite location determination system of claim 1, wherein said reception conditioning optics comprises means for providing polarization control.

11. The satellite location determination system of claim 1, wherein said optical to electronic signal converter comprises a semiconductor photodiode.

12. The satellite location determination system of claim 1, wherein said optical to electronic signal converter comprises a semiconductor avalanche photodiode.

13. The satellite location determination system of claim 1, wherein said optical to electronic signal converter comprises a photomultiplier.

14. A method for determining the location of a satellites in a constellation of satellites, comprising the steps of:
providing a plurality of optical transceivers, each associated with a respective satellite, each optical transceiver for providing the steps of:
 a) producing phase-coherent optical laser pulses via an optical synthesizer;
 b) conditioning the characteristics of said phase-coherent optical laser pulses;
 c) utilizing a telescope assembly for receiving an output of said transmission conditioning optics and transmitting an optical transceiver output into space for reception by an optical transceiver associated with another of said satellites in a constellation, said telescope assembly also for receiving an optical transceiver output from another of said satellites;
 d) conditioning the characteristics of the optical transceiver output received from another of said satellites, utilizing reception conditioning optics; and,
 e) receiving an output from said reception conditioning optics and providing an electronic signal output representing the location of other satellites in the constellation, wherein
  use of the optical synthesizer for producing the phase-coherent optical laser pulses provides enhanced satellite location information.

15. A satellite constellation, comprising:
a constellation of satellites, each satellite including an optical transceiver, comprising:
 a) an optical synthesizer for producing phase-coherent optical laser pulses;
 b) transmission conditioning optics for appropriately conditioning the characteristics of said phase-coherent optical laser pulses;
 c) a telescope assembly for receiving an output of said transmission conditioning optics and for transmitting an optical transceiver output into space for reception by an optical transceiver associated with another of said satellites, said telescope assembly also for receiving an optical transceiver output from another of said satellites;
 d) reception conditioning optics for appropriately conditioning the characteristics of the optical transceiver output received from said another of said satellites; and,
 e) an optical to electronic signal converter for receiving an output from said reception conditioning optics and providing an electronic signal output representing the location of other satellites in the constellation, wherein
  use of the optical synthesizer for producing the phase-coherent optical laser pulses provides enhanced satellite location information.

16. The satellite constellation of claim 15, wherein said optical synthesizer, comprises:
 a) a femtosecond mode-locked laser;
 b) a radio frequency source; and,
 c) a non-linear optical medium for coupling said femtosecond mode-locked laser to said radio frequency source via a nonlinear optical interaction, wherein
  said phase-coherent optical laser pulses contain frequency components ranging from a fundamental frequency of said mode-locked laser to a second harmonic frequency of the mode-locked laser in frequency steps that correspond to the frequency of the radio frequency source.

17. The satellite constellation of claim 15, wherein said non-linear optical medium comprises a photonic crystal optical fiber.

* * * * *